(12) United States Patent
Kruse et al.

(10) Patent No.: US 8,100,423 B2
(45) Date of Patent: Jan. 24, 2012

(54) CONNECTOR PIECE FOR THE ARTICULATED CONNECTION OF COMPONENTS LOCATED IN THE SUSPENSION OF A VEHICLE

(75) Inventors: Jochen Kruse, Osnabrück (DE); Frank Budde, Steinfeld-Mühlen (DE); Frank Nachbar, Lemförde (DE); Stefan Schönhoff, Belm (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 213 days.

(21) Appl. No.: 12/531,504

(22) PCT Filed: Mar. 6, 2008

(86) PCT No.: PCT/DE2008/050004
§ 371 (c)(1),
(2), (4) Date: Sep. 30, 2009

(87) PCT Pub. No.: WO2008/119341
PCT Pub. Date: Oct. 9, 2008

(65) Prior Publication Data
US 2010/0086346 A1   Apr. 8, 2010

(30) Foreign Application Priority Data
Mar. 29, 2007  (DE) .......... 10 2007 015 615

(51) Int. Cl.
*B60G 3/12* (2006.01)
(52) U.S. Cl. .......... 280/124.134; 280/124.166; 403/225
(58) Field of Classification Search .......... 384/215, 384/220–222; 403/122, 120, 203, 225, 372; 280/124.134, 124.166; 267/293, 294, 140.4
See application file for complete search history.

(56) References Cited

U.S. PATENT DOCUMENTS

| 1,794,782 | A | * | 3/1931 | Lord | 403/203 |
| 3,549,167 | A | * | 12/1970 | Haverbeck | 280/124.134 |
| 3,666,301 | A | * | 5/1972 | Jorn | 403/228 |
| 3,975,008 | A | * | 8/1976 | Meyer | 267/181 |
| 5,829,768 | A | | 11/1998 | Kaneko et al. | |
| 5,954,317 | A | * | 9/1999 | Meyer et al. | 267/140.12 |
| 6,030,570 | A | | 2/2000 | McLaughlin | |
| 6,062,762 | A | * | 5/2000 | Lustig | 403/270 |
| 7,364,176 | B2 | * | 4/2008 | Saitoh et al. | 280/124.13 |
| 7,441,759 | B2 | * | 10/2008 | Franke et al. | 267/282 |
| 7,556,273 | B2 | * | 7/2009 | Streubel et al. | 280/124.133 |
| 7,597,335 | B2 | * | 10/2009 | Nachbar | 280/124.128 |

(Continued)

FOREIGN PATENT DOCUMENTS
DE           40 08 465 A1     4/1991
(Continued)

*Primary Examiner* — Joshua Kennedy
(74) *Attorney, Agent, or Firm* — Davis & Bujold, P.L.L.C.

(57) ABSTRACT

A connector piece for the articulated connection of structural elements of a chassis of a motor vehicle. The connector piece has a main body, formed from at least one metal sheet, which has at least one bearing or joint and includes a housing connected to the main body and an inner part which is fitted within an inside space of the housing and can move relative to the housing. The housing comprises a housing portion that surrounds the inside space and includes at least two sheet-metal strips that are arranged adjacent one another, in a longitudinal direction, and are bent between their ends, in opposite directions transverse to the longitudinal direction, such that the metal strips partially surround the inside space on different sides.

17 Claims, 3 Drawing Sheets

U.S. PATENT DOCUMENTS

| | | | |
|---|---|---|---|
| 7,938,417 B2 * | 5/2011 | Ersoy et al. | 280/124.134 |
| 2003/0001323 A1 * | 1/2003 | Hettler | 267/140.12 |
| 2004/0135337 A1 | 7/2004 | Alesso et al. | |
| 2008/0157499 A1 * | 7/2008 | Nachbar | 280/124.128 |
| 2008/0213037 A1 | 9/2008 | Hofmann | |

FOREIGN PATENT DOCUMENTS

| | | |
|---|---|---|
| DE | 10 2004 043 658 B4 | 10/2006 |
| EP | 0 739 762 A1 | 10/1996 |
| EP | 1 217 233 A1 | 6/2002 |
| FR | 2 835 024 A1 | 7/2003 |

* cited by examiner

CONNECTOR PIECE FOR THE ARTICULATED CONNECTION OF COMPONENTS LOCATED IN THE SUSPENSION OF A VEHICLE

This application is a National Stage completion of PCT/DE2008/050004 filed Mar. 6, 2008, which claims priority from German patent application no. 10 2007 015 615.6 filed Mar. 29, 2007.

FIELD OF THE INVENTION

The invention concerns a connector piece for the articulated connection of structural elements located in the chassis of a vehicle, with at least one metal sheet which forms a main body, at least one bearing or joint with a housing fixed to the main body and an inner part that fits in the inside space of the housing and can move relative to the housing, which comprises a housing portion that surrounds the inside space and which is formed by the metal sheet. In addition, the invention concerns a method for producing such a connector piece.

BACKGROUND OF THE INVENTION

From EP 1 217 233 A1 a connector piece with a metal body is known, on which a ball joint is arranged. The ball joint has a plastic housing and a ball pin arranged partially therein. An end area of the metal body forms a flat profile in which there is a hole. The hole passes through the flat profile, whereby an annular structure is formed. The annular structure serves to reinforce the plastic housing and is embedded in it. The housing is preferably an integral plastic injection-molding, which is formed by injection molding around the end area. The connector piece can be designed as a transverse control arm connected on one side with the vehicle body and on the other side with one of the wheels or wheel carriers.

The annular structure that serves as metallic reinforcement has a relatively small length in the axial direction of the joint, which limits the stability of the joint housing.

U.S. Pat. No. 6,030,570 discloses a control arm with a metal plate which has two bores at its ends, each surrounded by an annular flange. A polymer housing completely surrounds the metal plate and has two connection points, each provided with a connection bore in which, in each case, an elastomer bearing bush is fitted. Preferably, the polymer housing is made by injection molding around the metal plate. Furthermore, two metal plates connected to one another by welding or riveting can be surrounded by the polymer housing. One of the metal plates has a third and a fourth bore and the other metal plate has a fifth and a sixth bore, such that the third and fifth bores define a first through-bore and the fourth and sixth bores define a second through-bore.

Since the annular flanges of the metal plates are one above the other, the metallic reinforcement formed thereby has a greater length as viewed in the longitudinal direction of the elastomer bearing bush. However, the metal plates have to be correctly positioned and secured to one another before injection molding is carried out around them, so that the bores are mutually aligned.

SUMMARY OF THE INVENTION

Starting from this prior art the purpose of the present invention is to develop further a connector piece of the type mentioned above, in such manner that the housing portion can extend over as large as possible an axial length of the housing when only a single metal sheet is used for the housing portion and the main body.

The connector piece according to the invention for articulated connection of structural elements located in the chassis of a vehicle, in particular a motor vehicle, comprises one or at least one metal sheet, of which a main body is formed, and at least one bearing or joint which comprises a housing in fixed connection with the main body and having an inner part that fits in an inside space of the housing and can move relative to the housing, which comprises a housing portion that surrounds the inside space, which is formed by the metal sheet, the housing portion comprising several or at least two sheet-metal strips arranged next to one another in a longitudinal or axial direction, which are bent over between their ends in opposite directions transversely to the longitudinal direction and thus partially surrounding the inside space on different sides.

Since the sheet-metal strips next to one another are bent over in different directions in alternation, the housing can be made with a relatively large axial length which depends, in particular, on the number of sheet strips next to one another, and on their width. The width of each longitudinal strip corresponds to the size of the respective sheet strip in the longitudinal direction. In particular, only a single metal sheet is used to form the connector piece. However, it is not intended that the invention is limited to this, so that more than one metal sheet could also be used. The metal sheets are in particular arranged over one another and are preferably directly in contact, so that a common sheet body is formed by the metal sheets. The metal sheet or sheets preferably consist of steel, aluminum, magnesium, titanium or stainless steel. In particular, the main body is in the form of a shell.

Before the sheet strips are bent over, they are separated from one another in particular by one or more slits that pass through the metal sheet and extend along the sheet strips transversely to the longitudinal direction.

The sheet strips preferably extend away from the main body and, in particular at their ends remote from the main body, are connected firmly to one another. For this a connecting strip can be provided, which runs in the longitudinal direction and is preferably formed by the metal sheet, so that at their ends remote from the main body the sheet strips are connected to one another by this connecting strip. Before the sheet strips are bent over, the slit or slits preferably extend(s) between the ends of the sheet strips facing toward the main body and their ends remote therefrom, in particular between the ends toward the main body and the connecting strip.

Each of the sheet strips surrounds the inside space, in particular only partially and not completely. Preferably, between their ends the sheet strips form curves, in particular of semicircular or substantially semicircular, or semi-elliptical or substantially semi-elliptical shape.

The housing preferably comprises a plastic part in which the sheet strips are embedded. This plastic part can extend as far as the main body, which is completely or partially embedded in it and/or has holes into or through which the plastic part extends. The plastic is preferably reinforced with fibers, for example glass fibers. Moreover, a polyamide can be used as the plastic.

The bearing or joint can be in the form of a ball joint, such that the inner portion forms a ball pin whose joint ball fits into and can rotate and/or pivot within the inside space, in particular with interposition of a bearing shell. Preferably, however, the bearing or joint forms an elastomer or rubber bearing, so that an elastomer or rubber body surrounding the inner part is present in the inside space, by means of which the inner part is in particular connected to the housing. The inner part consists for example of metal, and can be formed as a sleeve with a through-going cut-out.

At a distance from the housing at least one second joint or bearing is preferably connected to the main body. This second joint or bearing can be made for example as a ball joint or an elastomer bearing. In addition, at a distance from the housing and from the second joint or bearing a third joint or bearing can be connected fixed to the main body, so that the connector piece forms in particular a wishbone for a vehicle.

The connector piece according to the invention is used in particular for connecting a vehicle wheel to a vehicle body, the inner part preferably being connected to the vehicle body. The second joint or bearing will be or is fixed in particular to a steering knuckle or wheel carrier of the vehicle wheel. If there is a third joint or bearing, this will be or is preferably attached to the vehicle body. Thus, the structural elements located in the chassis of the vehicle preferably consist of the vehicle body and the vehicle wheel or the steering knuckle or wheel carrier. If an auxiliary frame or sub-frame is fixed to the vehicle body, the connector piece can also be attached to it. In that sense, an auxiliary frame and/or sub-frame counts as the vehicle body. The connector piece preferably forms an upper or lower transverse control arm in the wheel suspension.

The invention also concerns a method for producing a connector piece for the articulated connection of structural elements located in the chassis of a vehicle, such that:
  a main body is formed from one or at least one metal sheet,
  several or at least two sheet strips positioned in a longitudinal direction next to one another are formed in the metal sheet,
  the sheet strips are bent over in opposite directions transversely to the longitudinal direction to form an inside space, and
  in order to form a bearing or joint, or when it is formed, an inner part is attached in the inside space, so that it can move relative to the sheet strips.

The method according to the invention is preferably provided for producing the connector piece according to the invention, and can be developed further in accordance with all the versions described in this context. In particular, to form the sheet strips at least one or more slits are made in the metal sheet, which pass through the metal sheet and separate the sheet strips from one another. In particular, the main body is in the form of a shell.

The bent-over sheet strips are preferably embedded in plastic and, for this, can have the plastic injection-molded around them. Further, the main body can also be completely or partially embedded in the plastic, for which purpose this can for example be injected around the main body, in particular by plastic injection molding. During the embedding or injecting the plastic is preferably in a fluid condition and solidifies thereafter, so that the plastic forms a stiffening reinforcement for the bent-over sheet strips or the housing and/or the main body. In another embodiment the bent-over sheet strips can also themselves form the housing or part of the housing.

A distance away from the sheet strips, in particular at least one second bearing or joint is attached to the main body. In addition, a distance away from the sheet strips and from the second bearing or joint a third bearing or joint can be attached to the main body, so that the connector piece forms a wishbone.

With the connector piece and the method according to the invention it is possible, with a sheet-metal control arm, to integrate the connection geometry of rubber bearings in the sheet geometry. In particular, with a sheet-metal control arm the connection geometry of the rubber bearings can be formed together with the actual control arm housing sheets. It is also possible to produce a hybrid control arm, in which case the integration of the connection geometry of rubber bearings in the sheet geometry is followed by the plastic injection molding process, so that a shape-enclosing connection between the metal and the plastic is formed. In particular, in the case of hybrid control arms (metal-plastic combination) the connection geometry can be used for the plastic injection around or through the unit.

The particular advantages of sheet-type control arms are:
  low cost/weight,
  fewer components/assembly steps,
  simple production/smaller degree of deformation ("only" bending; no deep drawing),
  high-strength materials can be used,
  any metal can be used (steel/aluminum/magnesium/titanium/stainless steel, etc.),
  various sheet thicknesses can be used (even a sheet whose thickness varies),
  tailored blanks' can be used (or several sheets, spot-welded),
  additional corrugation for stiffening purposes is possible,
  little cutting (less scrap),
  the force flow can pass into the control arm in an ideal manner.

With hybrid control arms the following particular advantages are obtained:
  form-enclosing connection is possible between the metal and the plastic,
  the geometry is stiffened by positive interlock,
  great accuracy of shape is possible,
  variable shaping is possible.

BRIEF DESCRIPTION OF THE DRAWINGS

Below, the invention will be described with reference to a preferred embodiment illustrated in the drawings, which show.

DETAILED DESCRIPTION OF THE PREFERRED EMBODIMENTS

Figure 1:
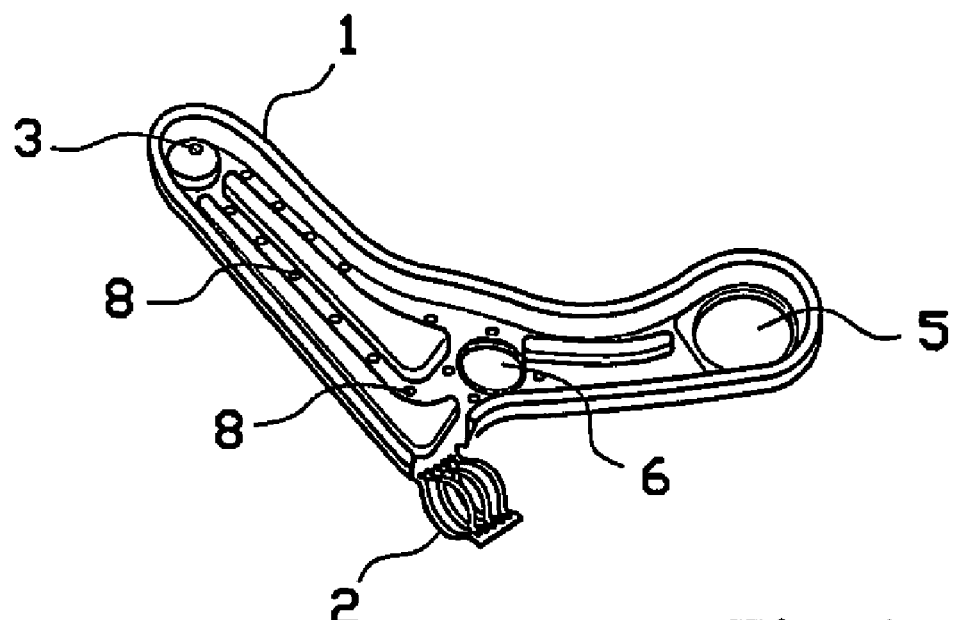
FIG. 1: Perspective view of the main body and the housing portion according to an embodiment of the invention, before the plastic has been injected around it and before the bearing or joint has been fitted.

FIG. 1 shows a main body 1 and a housing portion 2 of a connector piece according to an embodiment of the invention, the main body 1 and housing portion 2 being made from a common metal sheet. In the main body 1 there is a hole that passes through the metal sheet, into which a ball joint housing 3 of a ball joint 4 is pressed (see FIG. 5). In addition, two more holes 5 and 6 which pass through the metal sheet are formed in the main body 1, a bearing 7 (see FIG. 5) which is a ball joint or a rubber bearing being inserted into the hole 5. In this case the hole 6 serves only to allow the passage of a coupling rod for the roll stabilizer. In addition several small holes 8 are provided in the main body 1, which pass through the metal sheet.

Figure 2:
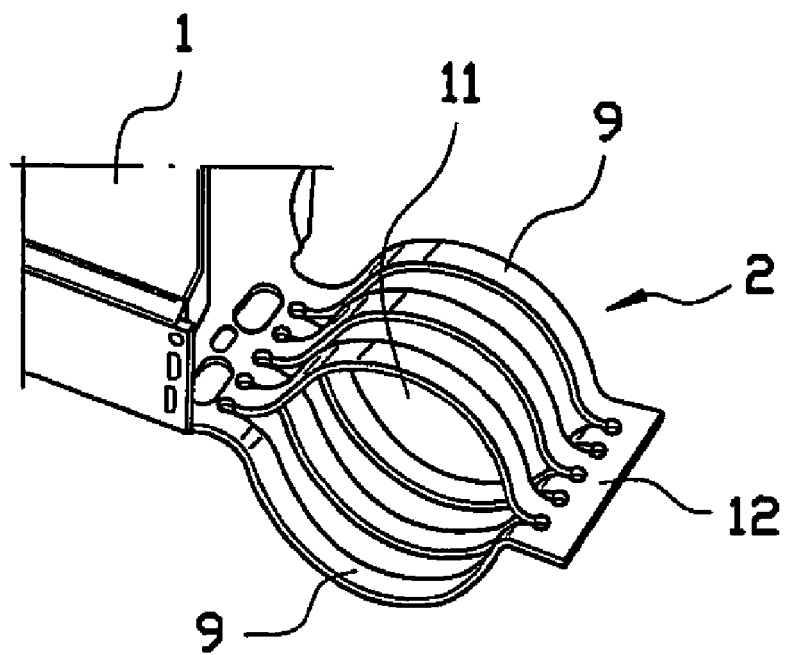
FIG. 2: Enlarged view of the housing portion in FIG. 1.
Figure 4:
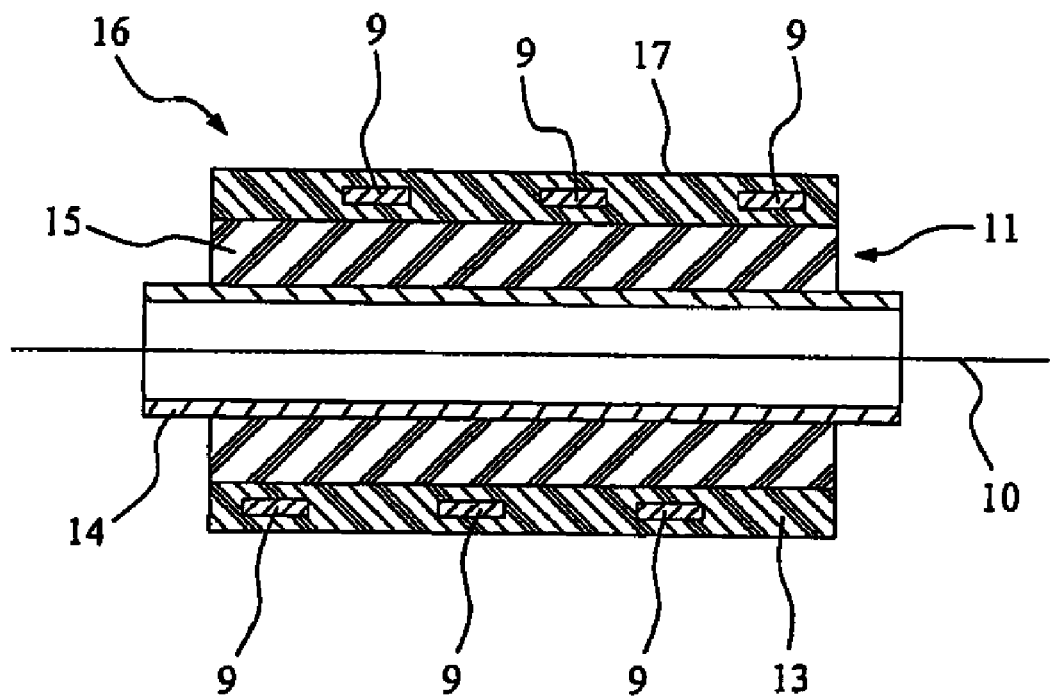
FIG. 4: Sectioned view through the ready-assembled bearing.

FIG. 2 shows an enlarged view of the housing portion 2 with part of the main body 1, the housing portion 2 having several, in this case six sheet-metal strips 9 which, viewed in a longitudinal direction 10 (see FIG. 4), are arranged next to one another. The sheet strips 9 are bent over alternately in opposite directions transversely to the longitudinal direction 10, and are each shaped in an approximate semicircle. This forms an inside space 11 that extends along the longitudinal direction 10, which is surrounded by the sheet strips 9. Each sheet strip 9 surrounds the inside space 11 only partially, and two directly adjacent sheet strips 9 surround the inside space 11 from different sides.

At their ends facing toward the main body 1 the sheet strips 9 merge into the main body 1. At their ends remote from the main body 1 the sheet strips 9 merge into a connecting strip 12 that runs in the longitudinal direction 10, which connects the sheet strips 9 to one another at their ends remote from the main body 1.

Figure 3:
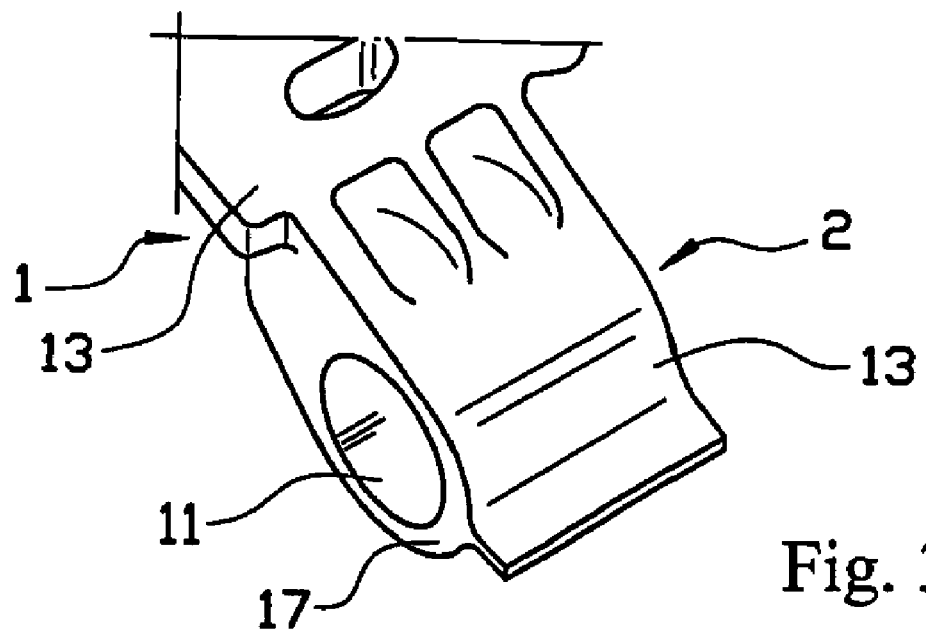
FIG. 3: Perspective view of the housing portion with part of the main body after the plastic has been injected round it but before assembly of the inner part.

The housing portion 2 and the main body 1 have plastic 13 injection-molded around them, the housing portion 2 together with part of the main body 1 surrounded by the plastic 13 being shown in FIG. 3. During the injection molding the plastic 13 passes through the holes 8 in the main body 1, so that a firm connection is formed between the main body 1 and the plastic 13. Furthermore, during the injection molding with plastic 13 the housing portion 2 with the sheet strips 9 and the connecting strip 12 becomes embedded in the plastic 13, which solidifies after injection molding. Then, an inner part 14 and an elastomer body 15 surrounding it are inserted or pressed into the inside space 11. This forms a rubber bearing 16, which is shown in section in FIG. 4. Together with the plastic 13, the housing portion 2 forms a housing 17 which surrounds the inside space 11 and the inner part 14 arranged in it with the elastomer body 15. Since the elastomer body 15 is yielding, the inner part 14 can be moved relative to the housing 17.

Figure 5:
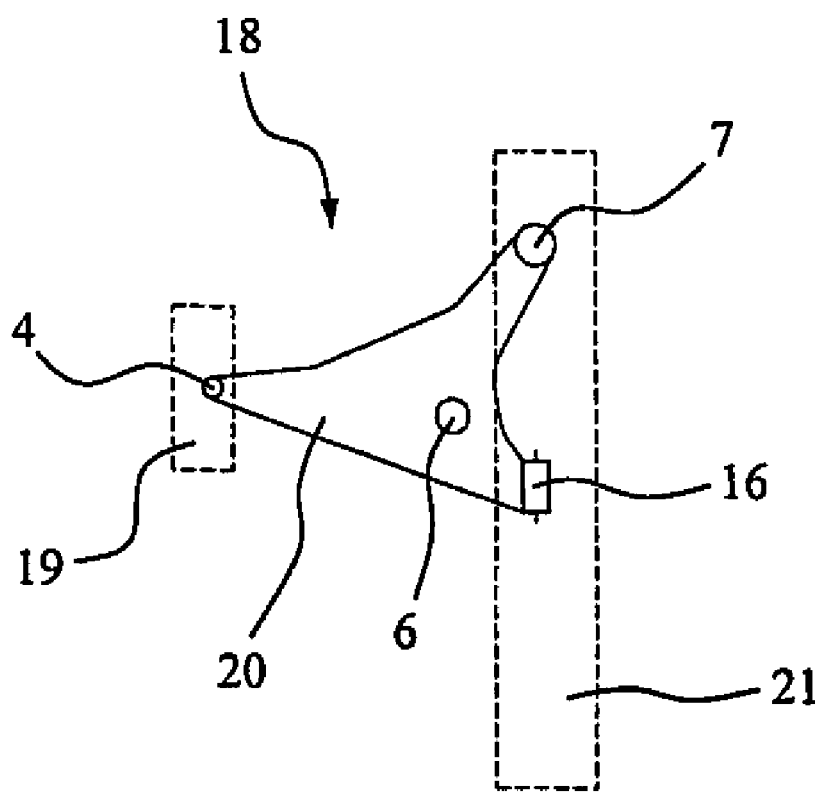
FIG. 5: Schematic view of a wheel suspension of a motor vehicle with the connector piece according to the embodiment illustrated.

FIG. 5 shows a schematic representation of a wheel suspension 18 of a motor vehicle, such that a vehicle wheel 19 is articulated to a vehicle body 21 by means of the connector piece 20 according to the embodiment described. The connector piece 20 forms a wishbone that includes the main body 1 and the housing portion 2, which is produced and configured in accordance with the description given above. The bearing 7 is preferably a rubber or elastomer bearing, in particular orientated transversely to the bearing 16. In that sense the bearing 16 can also be called the horizontal bearing and the bearing 7 the vertical bearing.

LIST OF INDEXES

1. Main body
2. Housing portion
3. Ball joint housing
4. Ball joint
5. Hole
6. Hole
7. Bearing
8. Hole
9. Sheet-metal strips
10. Longitudinal direction
11. Inside space
12. Connecting strips
13. Plastic
14. Inner part
15. Elastomer body
16. Rubber bearing
17. Housing
18. Wheel suspension
19. Vehicle wheel
20. Connector piece
21. Vehicle body

The invention claimed is:

1. A connector piece for an articulated connection of structural elements of a chassis of a motor vehicle, the connector piece comprising:
    a main body (1) being formed from at least one metal sheet,
    at least one bearing or joint (16) comprising a housing (17) that is connected to the main body (1), the housing (17) comprises a housing portion (2) that is formed by at least two sheet-metal strips (9) of the metal sheet and the housing portion (2) defines an inside space (11),
    the at least two sheet-metal strips (9) are arranged adjacent one another in a longitudinal direction (10)-and bent over between their ends in opposite directions transversely to the longitudinal direction (10) such that the at least two sheet-metal strips define the inside space (11) on different sides,
    an inner part (14) of the at least one bearing or joint (16) being located within an elastomeric body (15) in the inside space (11) defined by the housing portion (2) and the inner part (14) being movable relative to the housing (17), and
    the at least two sheet-metal strips (9) being completely embedded within the housing (17) such that the inner part (14) is spaced from the at least two sheet-metal strips (9).

2. The connector piece according to claim 1, wherein the at least two sheet-metal strips (9) extend away from the main body and are connected to one another at ends thereof remote from the main body (1).

3. The connector piece according to claim 2, wherein the housing portion (2) comprises a connecting strip (12) that extends in the longitudinal direction (10) and is formed by the metal sheet and joins the at least two sheet-metal strips (9) to one another at the ends thereof remote from the main body (1).

4. The connector piece according to claim 1, wherein the at least two sheet-metal strips (9) have one of a semicircular and a substantially semicircular shape.

5. The connector piece according to claim 1, wherein the housing (17) comprises a plastic material (13) in which the at least two sheet-metal strips (9) are embedded.

6. The connector piece according to claim 5, wherein the plastic material (13) either completely or partially encases the main body (1).

7. The connector piece according to claim 1, wherein the elastomeric body (15) is directly radially located between the inner part (14) and the housing (17) to separate the inner part (14) from the housing (17).

8. The connector piece according to claim 1, wherein at least one second joint or bearing (4) is fixedly connected to the main body (1) spaced from the housing (17).

9. The connector piece according to claim 8, wherein the at least one second joint or bearing (4) is a ball joint (4).

10. The connector piece according to claim 8, wherein the connector piece (20) forms a wishbone, and a third joint or bearing (7) is connected to the main body (1) spaced from the housing (17) and from the second joint or bearing (4).

11. The connector piece according to claim 1, wherein a portion of the housing (17) is radially located between the inner part (14) and the at least two sheet-metal strips (9).

12. A method of producing a connector piece for articulated connection of structural elements located in a chassis of a vehicle, the method comprising the steps of:

forming a main body (1) from at least one metal sheet;

forming at least two sheet-metal strips (9) from the at least one metal sheet, the at least two sheet-metal strips (9) being located next to one another in a longitudinal direction (10);

bending over the at least two sheet-metal strips (9) in opposite directions transversely to the longitudinal direction (10) to form an inside space (11); and fixing an inner part (14) within an elastometric body (15) in the inside space (11) to form either a bearing or a joint (16), and the inner part (14) being movable relative to the at least two sheet-metal strips (9); and completely embedding the at least two sheet-metal strips (9) within a housing (17) such that the inner part (14) is spaced from the at least two sheet-metal strips (9) by the housing (17) and the elastomeric body (15).

13. The method according to claim 12, further comprising the step of fixing at least a second bearing or joint (4) to the main body (1) at a distance away from the sheet strips (9).

14. The method according to claim 12, further comprising the step of embedding the sheet strips (9) in a plastic material (13) of the housing (17).

15. A connector piece for an articulately coupling structural elements to a motor vehicle chassis, the connector piece comprising:

a main body (1) being manufactured from at least one metal sheet and having a housing portion (2);

the housing portion (2) having a plurality of metal strips (9), each of the metal strips (9) having a first end integral with the main body (1) and a second end integral with a connecting strip (12);

each of the metal strips (9) having a substantially semicircular profile, the plurality of metal strips (9) being axially sequentially arranged side by side along a longitudinal axis (10), each of the metal strips (9) radially projects from the longitudinal axis (10) opposite to directly adjacent metal strips (9) such that two directly adjacent metal strips (9) form a circular profile about the longitudinal axis (10);

the main body (1) and the housing portion (2) being encompassed by plastic material (13) such that together the housing portion (2) and the plastic material (13) form a substantially cylindrical housing (17) that extends along the longitudinal axis (10); and a cylindrical inner part (14) being located and coaxially aligned within the substantially cylindrical housing (17), a portion of the plastic material (13) being located radially between the cylindrical inner part (14) and the housing portion (2) and the inner part (14) being retained within an elastomeric body (15) in the housing (17) but being movable relative to the housing (17).

16. The connector piece according to claim 15, wherein the cylindrical elastomeric body (15) is radially located between the inner part (14) and the substantially cylindrical housing (17).

17. The connector piece according to claim 16, wherein the cylindrical elastomeric body (15) directly couples and provides relative movement between the inner part (14) and the substantially cylindrical housing (17).

* * * * *